(12) United States Patent
Hinck et al.

(10) Patent No.: US 7,365,532 B2
(45) Date of Patent: Apr. 29, 2008

(54) APPARATUS TO RECEIVE SIGNALS FROM ELECTROMAGNETIC COUPLER

(75) Inventors: Todd Hinck, Arlington, MA (US); Alan Fiedler, Mountain View, CA (US); Matthew Becker, Harvard, MA (US); Georgios Asmanis, San Diego, CA (US); Jose Robins, Poway, CA (US)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 11/394,207

(22) Filed: Mar. 31, 2006
(Under 37 CFR 1.47)

(65) Prior Publication Data
US 2007/0236220 A1 Oct. 11, 2007

(51) Int. Cl.
*G01N 27/82* (2006.01)
(52) U.S. Cl. .................................. 324/213; 333/24 R
(58) Field of Classification Search ............. 333/28 R, 333/23, 24 R; 714/718, 724; 324/210, 213, 324/219, 537
See application file for complete search history.

(56) References Cited

U.S. PATENT DOCUMENTS 5,363,069 A * 11/1994 Sadhir et al. ............ 333/28 R
5,577,079 A * 11/1996 Zenno et al. ............... 375/373
6,573,801 B1    6/2003 Benham et al.
6,611,181 B2    8/2003 Marketkar et al.
6,987,428 B2    1/2006 Marketkar et al.
2002/0057136 A1   5/2002 Marketkar et al.
2002/0057137 A1   5/2002 Marketkar et al.
2004/0239438 A1  12/2004 Benham et al.
2005/0195013 A1   9/2005 Yang et al.

FOREIGN PATENT DOCUMENTS

JP    360059940 A  *  4/1985
WO   WO 02/060086     8/2002

OTHER PUBLICATIONS

John R. Benham et al. "An Alignment Insensitive Separable Electromagnetic Coupler for High-Speed Digital Multidrop Bus Applications", IEEE Transactions on Microwave Theory and Technologys, vol. 51, No. 12, Dec. 2003, pp. 2597-2603.

* cited by examiner

*Primary Examiner*—Don Le
(74) *Attorney, Agent, or Firm*—KED & Associates, LLP

(57) ABSTRACT

In at least one embodiment an apparatus is provided that includes an electromagnetic coupler probe to provide sampled electromagnetic signals and an electronics component to receive the sampled electromagnetic signals from the electromagnetic coupler probe and to provide recovered sampled electromagnetic signals. Other embodiments may be described and claimed.

20 Claims, 7 Drawing Sheets

APPARATUS TO RECEIVE SIGNALS FROM ELECTROMAGNETIC COUPLER

FIELD

Embodiments of the present invention may relate to the field of electromagnetic probing.

BACKGROUND

The probing of input/output (I/O) buses has been done using various direct-attached methodologies. Example methodologies may include resistive-based probe technology connected to a logic analyzer. However, as bus speeds scale to higher data rates, probing may cause signal integrity issues for a link under test (LUT).

BRIEF DESCRIPTION OF THE DRAWINGS

Embodiments of the present invention may become apparent from the following detailed description of arrangements, example embodiments, and the claims when read in connection with the accompanying drawings. While the foregoing and following written and illustrated disclosure focuses on disclosing arrangements and example embodiments of the invention, it should be clearly understood that the same is by way of illustration and example only and embodiments of the invention are not limited thereto.

The following represents brief descriptions of the drawings in which like reference numerals represent like elements and wherein.

DETAILED DESCRIPTION

In the detailed description to follow, example sizes/models/values/ranges may be given with reference to embodiments of the present invention. Other embodiments may also be used. Where specific details are set forth in order to describe example embodiments of the invention, it should be apparent to one skilled in the art that the invention can be practiced without these specific details.

In the following discussion, the terminology coupler probe and coupler may be used. These terminologies are intended to be interchangeable. Additionally, various devices may be referred to as first, second and/or third devices. The use of the terms first, second, and/or third is merely a label and is not intended to identify a specific location of a device with respect to other devices.

Embodiments of the present invention may provide an electronics component for a direct-attached electromagnetic (EM) coupler probe (or coupler). An EM coupler probe (such as a direct-attached EM coupler probe) samples a link under test (LUT) using back crosstalk coupled from signals on the LUT. The sampled signals are used to recover the digital signals that are present on the LUT. This is accomplished using an electronics receiver component (hereafter also called an electronics component). The coupler probe outputs a derivative of the LUT signal. The LUT output signal is recovered by integrating the signal. An integration function is an inverse of a derivative function, so a baseband signal gets restored albeit in a scaled form. Embodiments of the present invention may provide probing for signaling validation or logical debug using an analyzing device.

Figure 1:
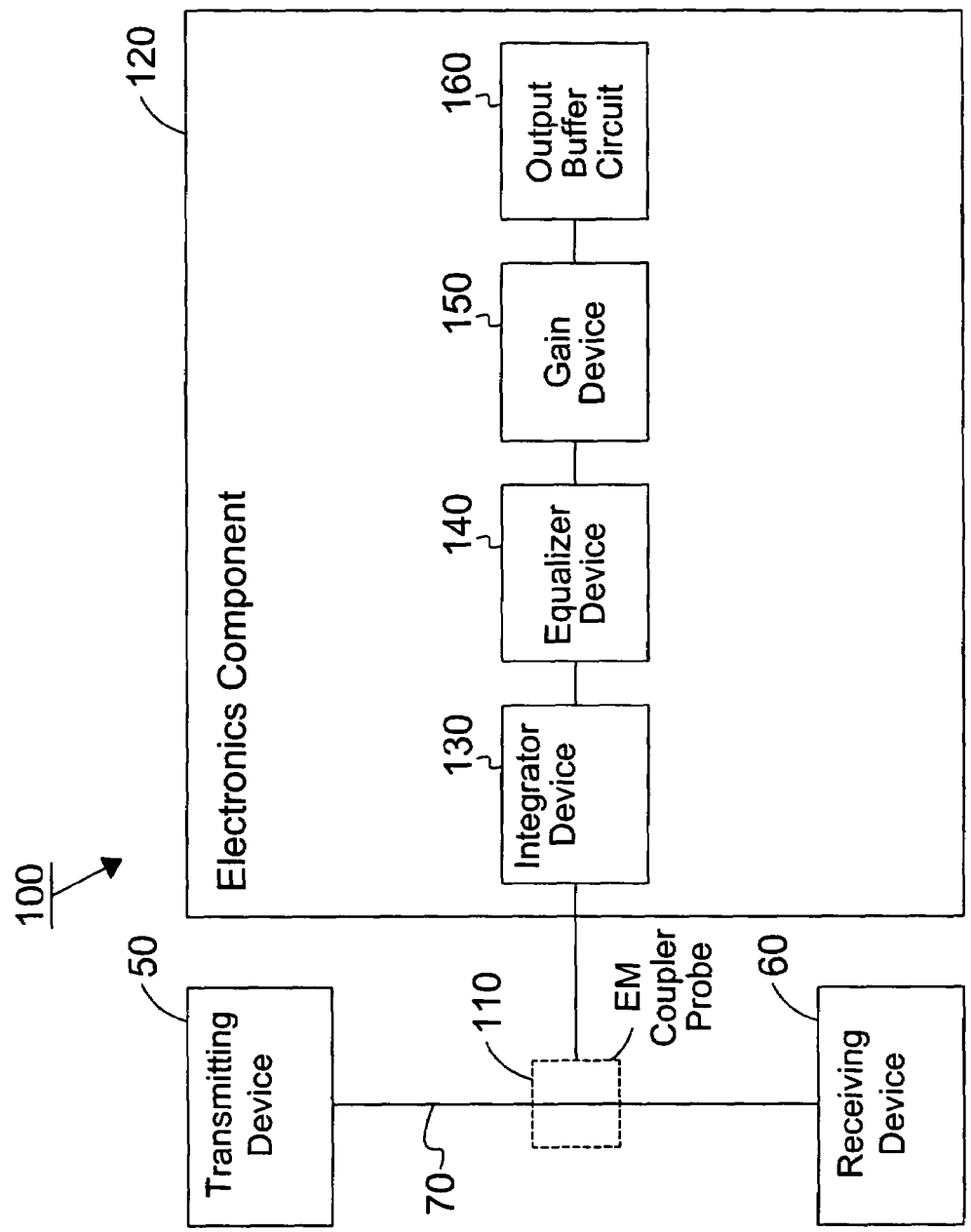
FIG. 1 is a diagram of an electromagnetic (EM) receiver coupled to a LUT according to an example embodiment of the present invention.

FIG. 1 is a diagram of an electromagnetic receiver coupled to a LUT according to an example embodiment of the present invention. Other embodiments and configurations may also be used. The embodiment shown in FIG. 1 may relate to direct current (DC) balanced or non-DC balanced data transmitted on a LUT. As one example, DC balanced data may include a clock signal encoded into the data signals.

FIG. 1 shows a transmitting device 50 and a receiving device 60 coupled by a LUT 70. The terminology LUT refers to at least one signal connection between the transmitting device 50 and the receiving device 60. Although the terminology LUT is used hereafter, the transmitting device 50 and the receiving device 60 may be coupled by a bus, an interconnect, signal lines, printed circuit board (pcb) traces, flex cables, micro-coax, and/or other electrical connection means.

The transmitting device 50 may include a data generating device to generate a data pattern, for example, to be transmitted on the LUT 70 to the receiving device 60. The data pattern may be differential DC encoded data. The transmitting device 50 may be provided on one chip and the receiving device 60 may be provided on another chip such that at least the LUT 70 is coupled between the two chips to enable the data pattern to be transmitted between the two chips. The data pattern may be transmitted and/or validated during a validation process of a product (that includes at least one of the two chips), during a debugging of a product (that includes at least one of the two chips) and/or during actual use of the product (that includes at least one of the two chips).

The EM receiver 100 shown in FIG. 1 may include an EM coupler probe 110 (shown as the dotted box) coupled to the LUT 70 and an electronics component 120 coupled to the EM coupler probe 110. These may be connected using micro-coax, printed circuit board (pcb) traces, flex cables, and/or other electrical connection means. The EM coupler probe 110 may provide sampled electromagnetic signals. The electronics component 120 may receive the sampled electromagnetic signals from the EM coupler probe 110 based on the data (or data patterns) transmitted on the LUT 70. The electronics component 120 may provide recovered sampled electromagnetic signals.

As one example, the EM coupler probe 110 may include two parallel signal traces provided for each differential pair of traces of the LUT 70. The EM coupler probe 110 may be coupled to the LUT 70, such as directly-coupled. Additionally, the EM coupler probe 110 may be alternating current (AC) coupled to the LUT 70 by having both inductive and capacitive coupling. As one example, the coupler probe strength, a measure of the coupled signal to the LUT signal, may be set between $0.1<K_c<0.2$, where Kc is defined as a coupling coefficient (i.e., a ratio of coupler output voltage to the LUT voltage at an input to the coupler probe) to remove approximately 1% to 4% of the LUT signal power. This may minimize LUT signal integrity impact. Other examples of the EM coupler probe 110 are also within the scope of the present invention.

The electronics component 120 of the EM receiver 100 may be provided on a chip and include an integrator device 130 (or integrator), an equalizer device 140 (or equalizer), a gain device 150 and an output buffer circuit 160 coupled in series to the EM coupler probe 110. The electronics component 120 of the EM receiver 100 performs signal processing to obtain recovered electromagnetic signals that may be used to validate or invalidate the data transmitted on the LUT 70. The data on the LUT 70 may be Binary No Return to Zero (BNRZ) data, 8B10B data or 64B66B data, for example. Other types of data may also be used. The electronics component 120 may thereby recover DC-balanced LUT data by recovering the electromagnetically coupled data (or non-run length limited data).

Stated differently, the electronics component 120 may provide recovered electromagnetic signals. Inputs and outputs of the electronics component 120 of the EM receiver 100 (or the chip of the electronics component 120) may be differential. Output signals of the electronics component 120 may be provided to an analyzing device to validate or invalidate the data on the LUT. The analyzing device may be an oscilloscope, logic analyzer or other apparatus to analyze the recovered data. Accordingly, the electronics component 120 performs signal processing to the received electromagnetic signals to allow data signals corresponding to the recovered sampled signals to be validated.

In this example, the integrator device 130 may be considered a first stage of the electronics component 120, the equalizer device 140 may be considered a second stage of the electronics component 120 and the gain device 150 may be considered a third stage of the electronics component 120. Other numbers of stages and components of stages may also be used.

The EM coupler probe 110 may couple information (i.e., electromagnetic signals) from the LUT 70 with a high pass filter-like transfer function. Stated differently, the EM coupler probe 110 may have a high pass filter response. The integrator device 130 may perform a reverse transform on the data signals received from the EM coupler probe 110. The integrator device 130 transforms the overall transfer function into a band pass filter that is broad enough to match a frequency content of the data on the LUT 70. Accordingly, the integrator device 130 may provide a filter function to transform the received sampled electromagnetic signals.

As one example, the inversion by the integrator device 130 may be illustrated by a derivative function whose slope is 20 decibel/decade (dB/dec) and that increases with an increasing frequency. Likewise an integrator device may have a slope of −20 dB/dec and decreases with increasing frequency. In the frequency domain, linear system magnitudes may be added together, so an integrator function added to a derivative function the slope of the derivative signal. For the integrator device 130 in the EM receiver 100, this inversion may be applied. The added integrator plus derivative functions may form a band pass filter where the derivative and integrator slopes offset each other. The characteristics of the integrator device 130 influence the size and magnitude of the band pass filter. The integrator device 130 may be designed or be adjusted to provide a specific filter function. As one example, the unity gain frequency of the integrator device 130 may equal the frequency of the data rate of the LUT.

The equalizer device 140 may enhance high frequency content to compensate for any line loss on the LUT 70. The gain device 150 may amplify the signals from the equalizer device 140 before the signals are output from the EM receiver 100 (such as off-chip) by the output buffer circuit 160. The output buffer circuit 160 may output the recovered electromagnetic signals. Although not shown in FIG. 1, the gain device 150 may be provided prior to the equalizer device 140.

Figure 2:
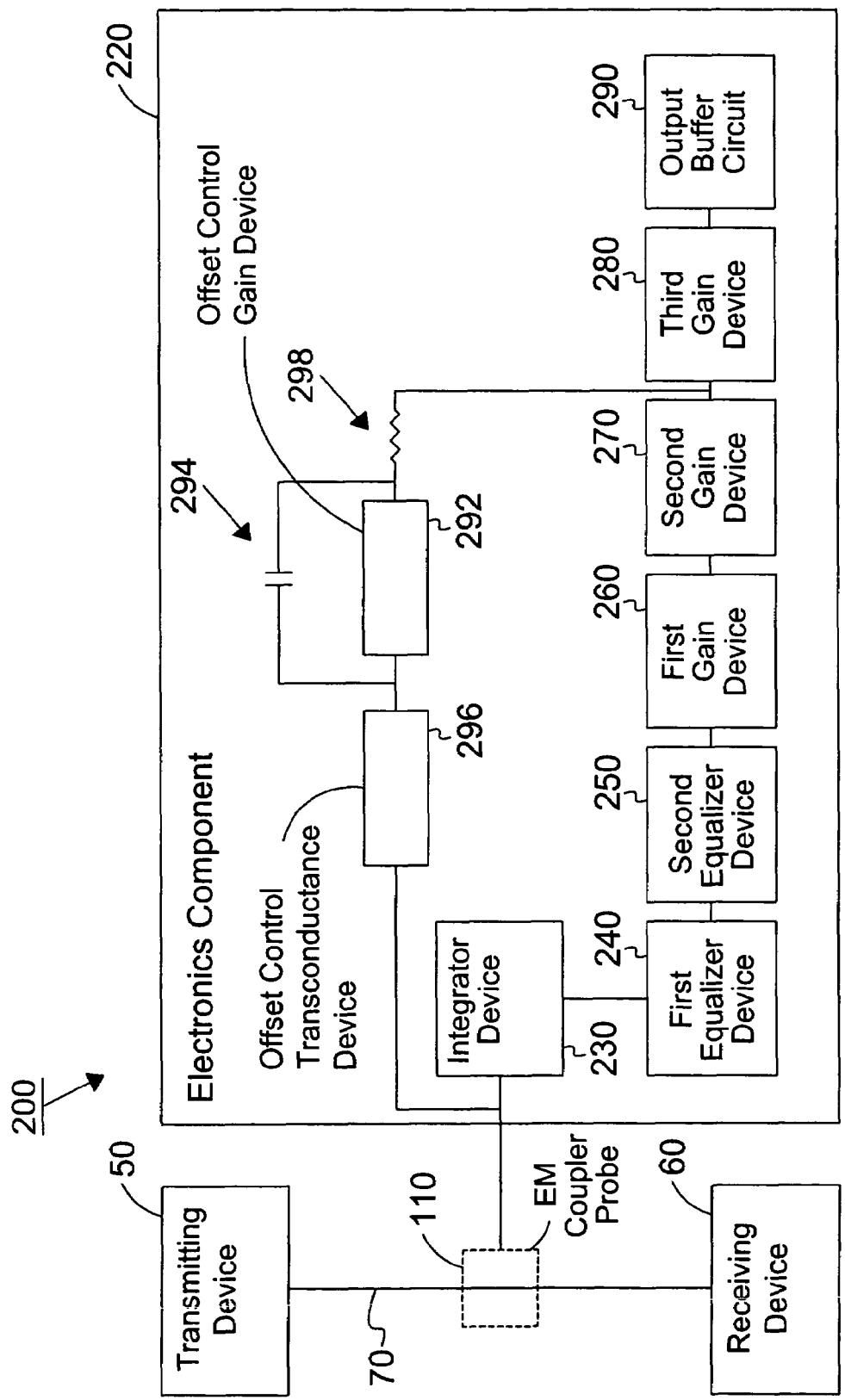
FIG. 2 is a diagram of an EM receiver coupled to a LUT according to an example embodiment of the present invention.

FIG. 2 is a diagram of an EM receiver coupled to a LUT according to an example embodiment of the present invention. Other embodiments and configurations may also be used. The embodiment shown in FIG. 2 may relate to DC balanced data transmitted on the LUT 70. As one example, the DC balanced data may include a clock signal embedded into the data signals.

FIG. 2 shows the transmitting device 50 and the receiving device 60 coupled by the LUT 70 in a similar manner as described above with respect to FIG. 1.

FIG. 2 also shows an EM receiver 200 that includes the EM coupler probe 110 coupled to the LUT 70 and an electronics component 220 coupled to the EM coupler probe 110. The EM coupler probe 110 may provide sampled electromagnetic signals. The electronics component 220 may receive the sampled electromagnetic signals from the EM coupler probe 110 based on the data (or data patterns) transmitted on the LUT 70. The electronics component 220 may provide recovered sampled electromagnetic signals.

The electronics component 220 of the EM receiver 200 may be provided on a chip and include an integrator device 230, a first equalizer device 240, a second equalizer device 250, a first gain device 260, a second gain device 270, a third gain device 280 and an output buffer circuit 290 coupled in series to the EM coupler probe 110.

The EM receiver 200 also includes an offset control gain device 292, an offset control transconductance device 296, a resistor 298 and a capacitor 294 coupled as a feedback loop between an output of the second gain device 270 and an input of the integrator device 230. The feedback loop including the offset control gain device 292, the offset control transconductance device 296, the capacitor 294 and the resistor 298 may perform offset correction.

The electronics component 220 of the EM receiver 200 performs signal processing to obtain recovered electromagnetic signals that may be used to validate or invalidate the DC balanced data transmitted on the LUT 70. The electronics component 220 may thereby recover DC-balanced electromagnetically coupled data (or run length limited coded data). Stated differently, the electronics component 220 may provide recovered electromagnetic signals. Inputs and outputs of the electronics component 220 of the EM receiver 200 (or the chip of the electronics component 220) may be differential. Output signals of the electronics component 220 may be provided to an analyzing device to validate or invalidate the data on the LUT 70. The analyzing device may be an oscilloscope, logic analyzer or other apparatus to analyze the recovered data. Accordingly, the electronics component 220 performs signal processing to the received electromagnetic signals to allow data signals corresponding to the recovered sampled signals to be validated.

In the FIG. 2 embodiment, the first equalizer device 240 and the second equalizer device 250 are provided after the integrator device 230. A 2-zero equalizer function may also be provided by using two equalizer stages. This may be implemented by replacing a gain device with an additional equalizer device. Each equalizer may implement a $1^{st}$ order filter function.

The EM coupler probe 110 may couple information (i.e., electromagnetic signals) from the LUT 70 with a high pass filter-like transfer function. Stated differently, the EM coupler probe 110 may have a high pass filter response. The integrator device 230 may perform a transformation on the signals received from the EM coupler probe 110. The integrator device 230 transforms the overall transfer function into a band pass filter that is broad enough to match a frequency content of the DC balanced data on the LUT 70. The integrator device 230 may be designed or be adjusted to provide a specific filter function. As one example, the unity gain frequency of the integrator device 230 may equal the frequency content of the data rate of the LUT 70. Accordingly, the integrator device 230 may provide a filter function to transform the received sampled electromagnetic signals.

As one example, the integrator device 230 may have a unity gain of approximately 3 GHz and a bandwidth of 20 MHz, for example. The bandwidth may set a 10% droop constraint for 5 Gb/s DC balanced data. In one example, an output of the integrator device 230 may be less than 150 millivolts (mV) whereas the coupler's output amplitude may be 20-120 mV. Other values may also be used. A bias circuit may be adjusted to scale the unity gain frequency lower, so that the output stays within a given range.

The first and second equalizer devices 240 and 250 may be implemented as differential current-mode logic (CML) amplifiers with resistive and inductive loads. These amplifiers may have source-degradation tuning based on passive resistors and capacitors. Each of the first and second equalizer devices 240 and 250 may be independently tuned. The first and second equalizer devices 240 and 250 may also have switchable output capacitance to compensate for over-equalized signals.

The first, second and third gain devices 260, 270 and 280 may be differential CML amplifier stages that provide amplification of the received signals. The first and second gain devices 260 and 270 may use different types of differential loads. The output buffer circuit 290 may be a CML 50-ohm output driver. The output buffer circuit 290 may provide the recovered electromagnetic signals to an external 50-ohm device, for example.

Figure 3A:
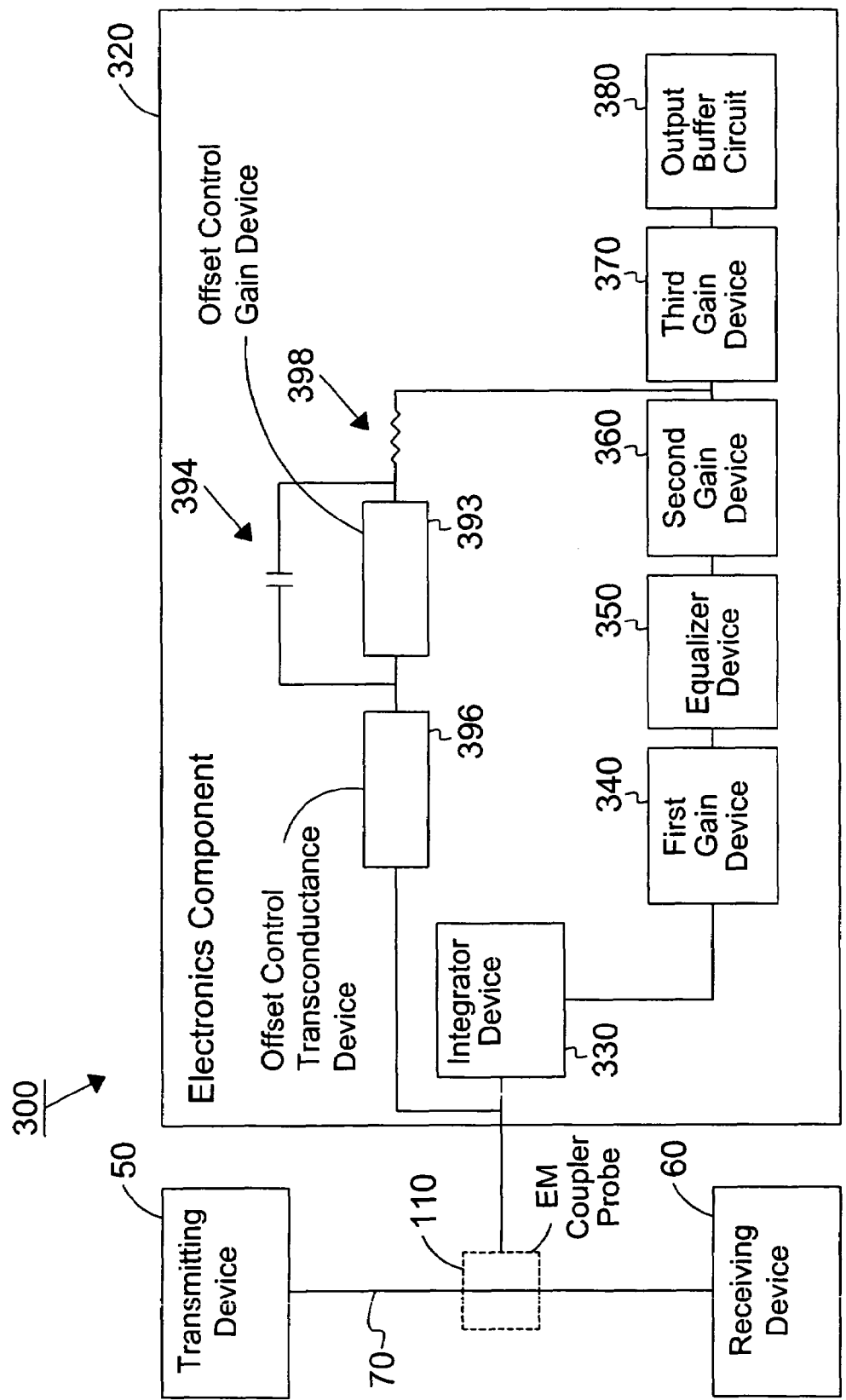
FIG. 3A is a diagram of an EM receiver coupled to a LUT according to an example embodiment of the present invention.

FIG. 3A is a diagram of an EM receiver coupled to a LUT according to an example embodiment of the present invention. Other embodiments and configurations may also be used. The embodiment shown in FIG. 3A may relate to DC balanced data transmitted across the LUT 70. As one example, the encoded data may include a clock signal embedded into the data signals.

FIG. 3A shows the transmitting device 50 and the receiving device 60 coupled to the LUT 70 in a similar manner as described above with respect to FIG. 1.

FIG. 3A also shows an EM receiver 300 that includes the EM coupler probe 110 coupled to the LUT 70 and an electronics component 320 coupled to the EM coupler probe 110. The EM coupler probe 110 may provide sampled electromagnetic signals. The electronics component 320 may receive the sampled electromagnetic signals from the EM coupler probe 110 based on the data (or data patterns) transmitted on the LUT 70. The electronics component 320 may provide recovered sampled electromagnetic signals.

The electronics component 320 may be provided on a chip and include an integrator device 330, a first gain device 340, an equalizer device 350, a second gain device 360, a third gain device 370 and an output buffer circuit 380 coupled in series to the EM coupler probe 110.

The EM receiver 300 also includes an offset control gain device 392, a capacitor 394 and an offset control transconductance device 396 coupled in a feedback loop between an output of the second gain device 360 and an input of the integrator device 330. The electronics component 320 of the EM receiver 300 performs signal processing to obtain recovered electromagnetic signals that may be used to validate or invalidate DC-balanced data having a limited run length which is transmitted on the LUT 70. The electronics component 320 may thereby recover DC-balanced electromagnetically coupled data having a limited run length.

Stated differently, the electronics component 320 may provide recovered electromagnetic signals. Inputs and outputs of the electronics component 320 of the EM receiver 300 (or the chip of the electronics component 320) may be differential. Output signals of the electronics component 320 may be provided to an analyzing device to validate or invalidate the data on the LUT. The analyzing device may be an oscilloscope, logic analyzer or other apparatus to analyze the recovered data. Accordingly, the electronics component 320 performs signal processing to the received electromagnetic signals to allow data signals corresponding to the recovered sampled signals to be validated.

In the FIG. 3A embodiment, the first gain device 340 is provided after the integrator device 330 and prior to the equalizer device 350. Further, this embodiment may implement a single equalizer device.

The integrator device 330 may correspond to the integrator device 230 discussed above. The equalizer device 350 may correspond to one of the first or second equalizer devices 240 and 250 discussed above. Further, each of the first, second and third gain devices 340, 350 and 360 may correspond to one or more of the first, second and third gain devices 260, 270 and 280 discussed above. Even further, the offset control gain device 392, the capacitor 394 and the offset control transconductance device 396 may correspond to the offset control gain device 292, the capacitor 394 and offset control transconductance device 396 discussed above.

Figure 3B:
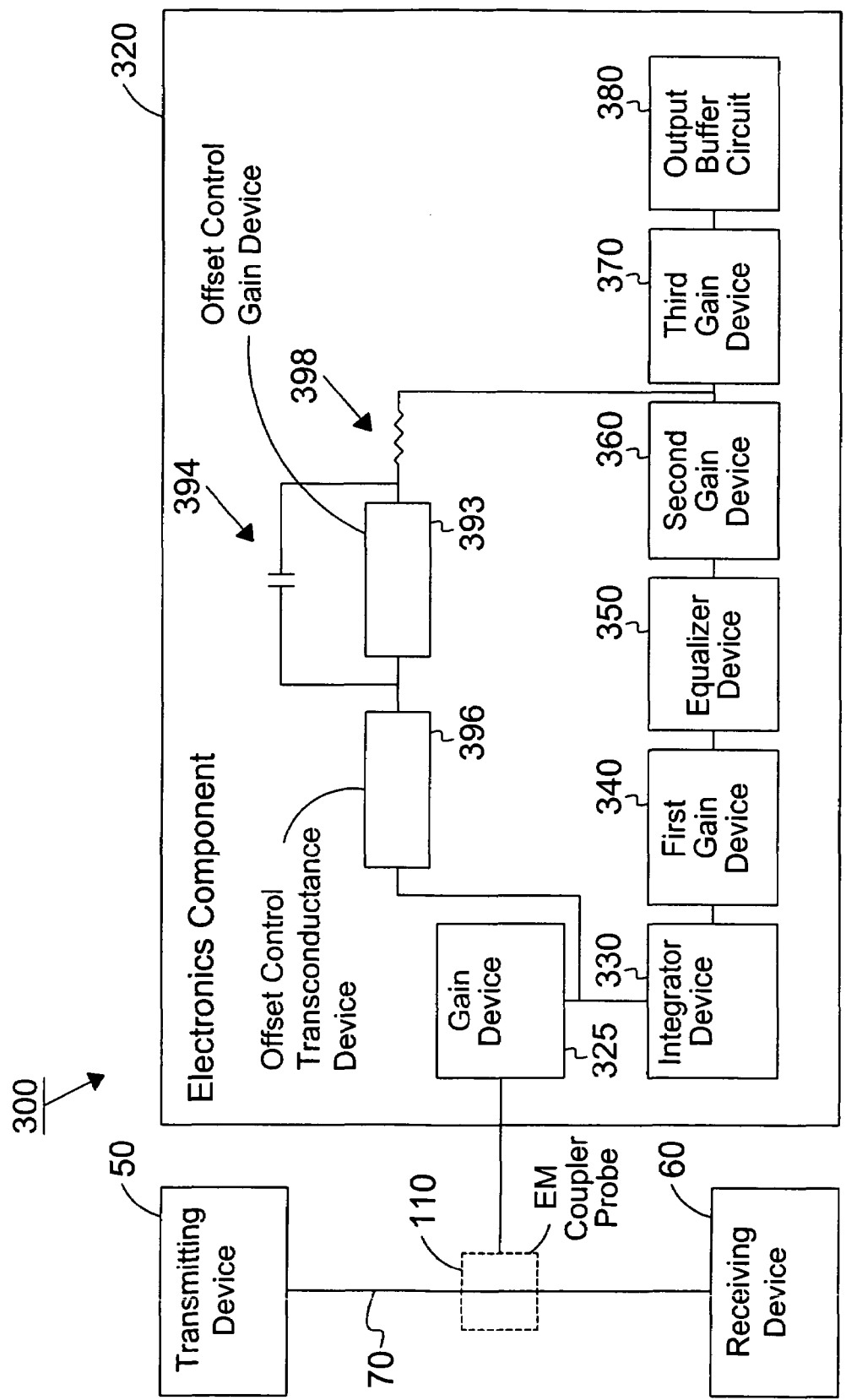
FIG. 3B is a diagram of an EM receiver coupled to a LUT according to an example embodiment of the present invention.

FIG. 3B is a diagram of an EM receiver coupled to a LUT according to an example embodiment of the present invention. Other embodiments and configurations may also be used. More specifically, the FIG. 3B embodiment is similar to the FIG. 3A embodiment except that the electronics component 320 also includes a gain device 325 prior to an input of the integrator device 330. Thus, in view of the similar components in FIGS. 3A and 3B, a further description of FIG. 3B will not be provided.

Figure 4A:
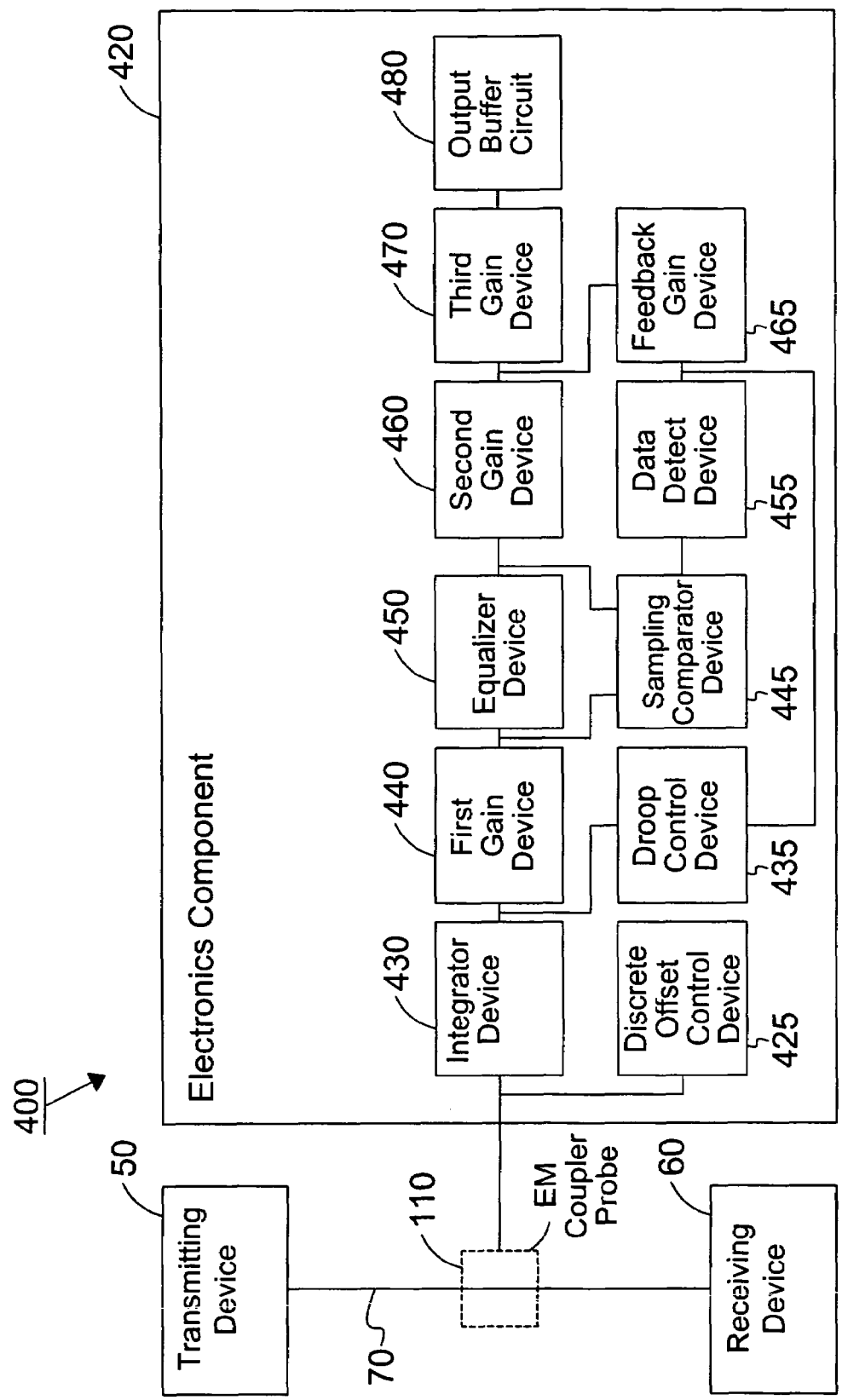
FIG. 4A is a diagram of an EM receiver coupled to a LUT according to an example embodiment of the present invention.

FIG. 4A is a diagram of an EM receiver coupled to a LUT according to an example embodiment of the present invention. Other embodiments and configurations may also be used. The embodiment shown in FIG. 4A may relate to non-DC balanced data transmitted across the LUT 70. As one example, non-DC balanced data may not include clock signals embedded within the data signals. The embodiment shown in FIG. 4A may also relate to DC balanced data transmitted across the LUT 70.

FIG. 4A shows the transmitting device 50 and the receiving device 60 coupled by the LUT 70 in a similar manner as described above with respect to FIG. 1. However, in the FIG. 4A embodiment, non-DC balanced data is transmitted between the transmitting device 50 and the receiving device 60.

FIG. 4A also shows an EM receiver 400 that includes the EM coupler probe 110 coupled to the LUT 70 and an electronics component 420 coupled to the EM coupler probe 110. The EM coupler probe 110 may provide sampled electromagnetic signals. The electronics component 420 may receive the sampled electromagnetic signals from the EM coupler probe 110 based on DC balanced (or data patterns) transmitted on the LUT 70. The electronics component 520 may also receive the sampled electromagnetic signals from the EM coupler probe 110 based on non-DC balanced data (or data patterns) transmitted on the LUT 70. The electronics component 420 may provide recovered sampled electromagnetic signals.

The electronics component 420 may be provided on a chip and include an integrator device 430, a first gain device 440, an equalizer device 450, a second gain device 460, a third gain device 470 and an output buffer circuit 480 coupled in series to the EM coupler probe 110. The electronics component 420 of the EM receiver 400 may use a discrete offset circuit rather that a continuous-time offset loop as shown in FIGS. 2, 3A and 3B (i.e., in DC balanced systems). More specifically, the electronics component 420 of the EM receiver 400 may include a discrete offset control device 425 coupled to an input of the integrator device 430.

The electronics component 420 may also include a droop control device 435 coupled to an output of the integrator device 430. Alternatively, the droop control device 435 may be coupled directly to the integrator device 430 to control an output of the integrator device 430. More specifically, a droop control device 435 may also be coupled to an output of the integrator device 430 (and to an input of the first gain device 440) or directly to the integrator device 430 to control the output of the integrator device 430. The droop control device 435 applies an amount of current to an output of the integrator device 430 to hold output data of the integrator device 430 at a correct state (such as a HIGH state) or to substantially maintain the output data of the integrator device 430 at a particular level.

A sampling comparator device 445 may be coupled to an output of the first gain device 440 (and an input of the equalizer device 450) and to an output of the equalizer device 450. A feedback gain device 465 may be coupled to an output of the second gain device 460. The feedback gain device 465 may also be coupled a data detect device 455 such that the feedback gain device 465 provides signals to the data detect device 455 and the data detect device 455 provides signals to the sampling comparator device 445. An output of the feedback gain device 465 may also be provided to the droop control device 435 to control the output of the integrator device 430.

The electronics component 420 of the EM receiver 400 performs signal processing to obtain signals that may be used to validate the non-DC balanced data transmitted on the LUT 70. The electronics component 420 may thereby recover non-DC balanced electromagnetically coupled data (or non run length limited coded data). Stated differently, the electronics component 420 may provide recovered electromagnetic signals. Inputs and outputs of the electronics component 420 of the EM receiver 400 (or the chip of the electronics component 420) may be differential. Output signals of the electronics component 420 may be provided to an oscilloscope, logic analyzer or other apparatus to analyze the recovered data. Accordingly, the electronics component 420 performs signal processing to the received electromagnetic signals to allow data signals corresponding to the recovered sampled signals to be validated.

The EM coupler probe 110 may couple information (i.e., electromagnetic signals) from the LUT 70 with a high pass filter-like transfer function. The integrator device 430 may perform a reverse transform on the data signals received from the EM coupler probe 110. The integrator device 430 transforms the overall transfer function into a band pass filter that is broad enough to match a frequency content of the data on the LUT 70.

An adaptive feedback loop is provided by the droop control device 435 to latch an output of the integrator device 430. This positive feedback of the adaptive feedback loop may restore a DC portion of the baseband signal. The strength of the droop may be set via the adaptive feedback loop that includes the droop control device 435, the sampling comparator device 445 and the data detect device 455. More specifically, the data detect device 455 may monitor an incoming data stream (received from the feedback gain device for example) for isolated data transitions and may use the data transitions to generate a sampling clock for the sampling comparator device 445.

The sampling comparator device 445 may use positive and negative edges of the generated clock to sample the incoming data stream at two locations (i.e., an input and an output of the equalizer device 450). The positive edge of the generated clock may be used to sample a first position after a rising isolated edge. The negative edge of the generated clock may be used to sample a second position at a fixed delay after the first sample. As the negative edge switches, the sampling comparator device 445 may also subtract the second sample from the first sample. This difference may result in an error indication that indicates when the output of the integrator device 430 has significant droop. Stated differently, the sampling comparator device 445 may determine a droop on an output of the integrator device 430.

Figure 4B:
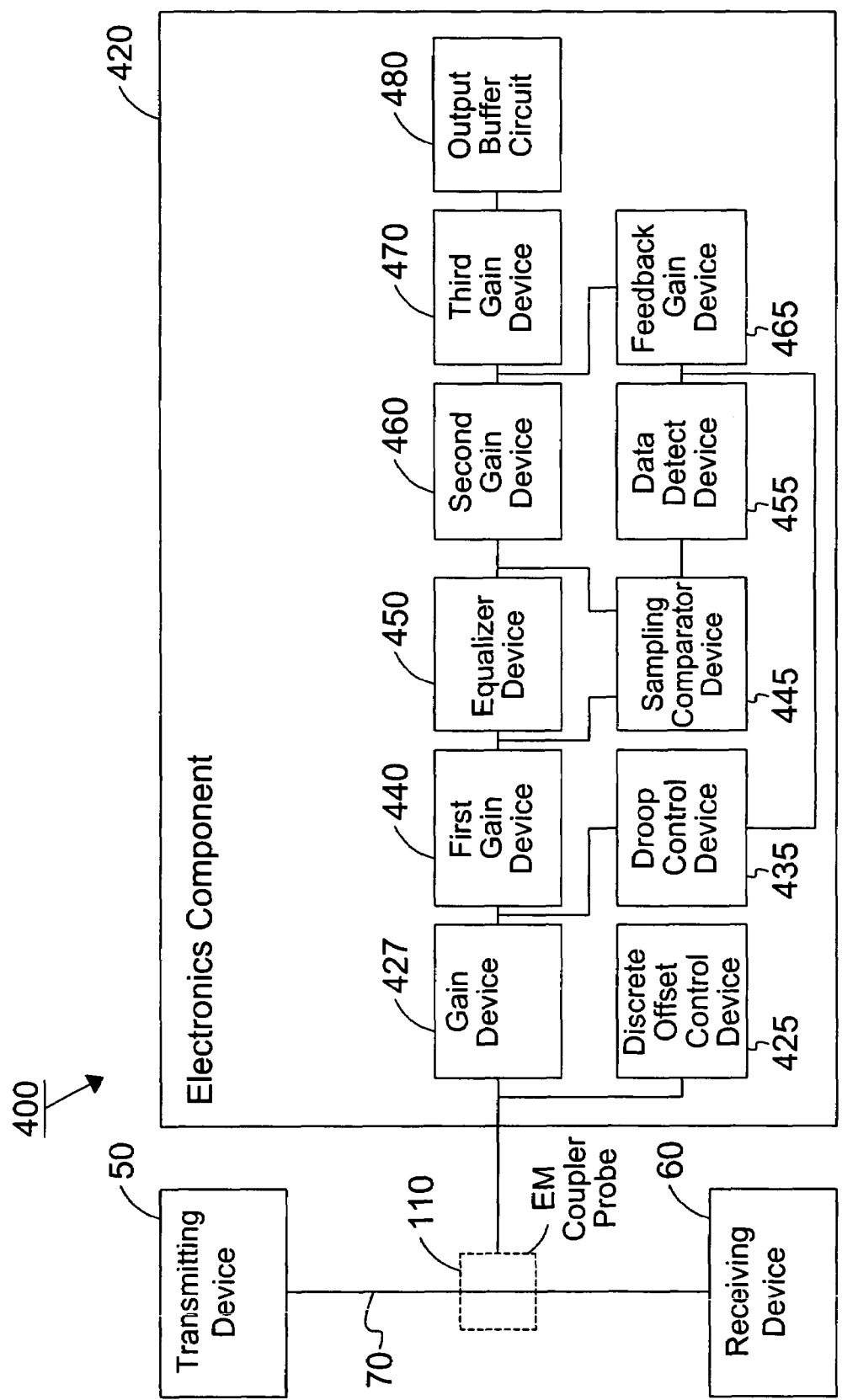
FIG. 4B is a diagram of an EM receiver coupled to a LUT according to an example embodiment of the present invention.

FIG. 4B is a diagram of an EM receiver coupled to a LUT according to an example embodiment of the present invention. Other embodiments and configurations may also be used. The FIG. 4B embodiment is similar to the FIG. 4A embodiment except that the EM receiver 420 includes a gain device 427 rather than the integrator device 430. Thus, in view of the similar components of FIGS. 4A and 4B, a further description of FIG. 4B will not be provided.

In another embodiment, the electronics component 420 may also include a gain device located prior to the integrator device 430 shown in FIG. 4A.

Figure 5:
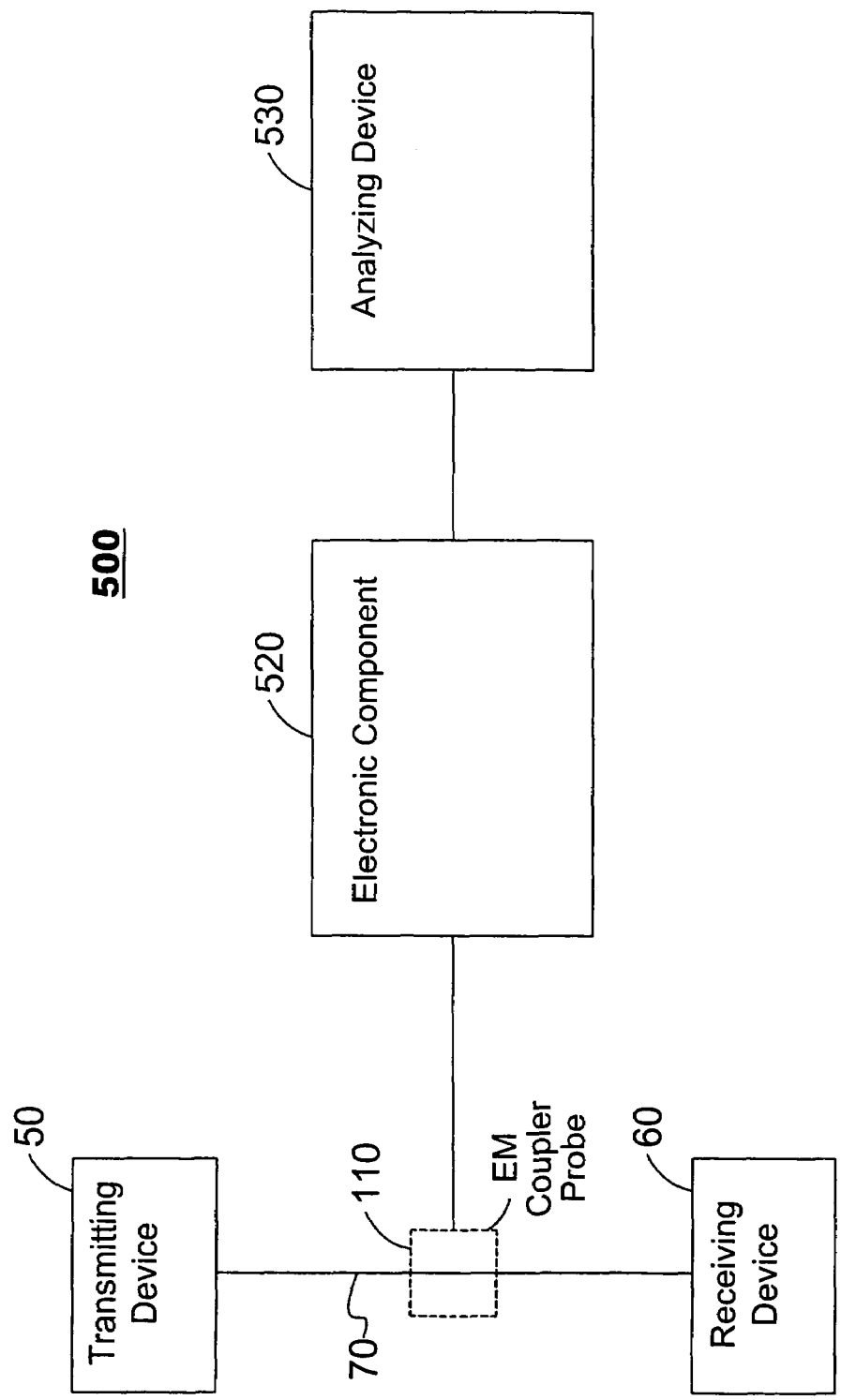
FIG. 5 is a diagram of a system according to an example embodiment of the present invention.

FIG. 5 is a diagram of a system according to an example embodiment of the present invention. Other embodiments and configurations may also be used. More specifically, FIG. 5 shows the transmitting device 50 and the receiving device 60 coupled by the LUT 70 in a similar manner as described above with respect to FIG. 1. In this example, DC balanced data signals or non-DC balanced data signals may be transmitted between the transmitting device 50 and the receiving device 60.

FIG. 5 also shows an EM receiver 500 that includes the EM coupler probe 110 coupled to the LUT 70 and an electronics component 520 coupled to the EM coupler probe 110. The EM coupler probe 110 may provide sampled electromagnetic signals. The electronics component 520 may receive the sampled electromagnetic signals from the EM coupler probe 110 based on the data (or data patterns) transmitted on the LUT 70. The electronics component 520 may provide recovered sampled electromagnetic signals. The electronics component 520 may correspond to any one of the electronics components 120, 220, 320, and 420 discussed above or to another electronics component that provides recovered electromagnetic signals based on electromagnetic signals received from the EM coupler probe 110.

FIG. 5 additionally shows an analyzing device 530 coupled to the electronics component 520 to receive the recovered electromagnetic signals and to validate or invalidate the recovered electromagnetic signals. The analyzing device 530 may include an oscilloscope, logic analyzer, custom hardware/software or other apparatus to analyze the recovered signals. As one example, the analyzing device 530 may transform the recovered electromagnetic signals into data that may be compared against test data that corresponds to the data transmitted across the LUT 70. This test data may be appropriately stored on the analyzing device 530 in a memory device and may be provided from another source prior to be stored thereon.

Embodiments of the present invention have been discussed above with respect to an EM receiver (such as any one of the receivers 100, 200, 300, 400 and 500). The EM receivers may recover the signals that are sampled on the LUT 70 between the transmitting device 50 and the receiving device 60.

Embodiments of the present invention may achieve a low noise performance because the integrator devices discussed above may have a relatively low bandwidth to filter input thermal noise. Further, the integrator device's high DC gain at the front of an amplifier chain may dominate any input noise. Noise performance can be further by adjusting the unity gain of the integrator device to a higher frequency.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An apparatus comprising:
    an electromagnetic coupler probe to provide sampled electromagnetic signals based on data transmitted across a link; and
    an electronics component to receive the sampled electromagnetic signals from the electromagnetic coupler probe and to provide recovered sampled electromagnetic signals based on the received sampled electromagnetic signals, the electronics component including an integrator device to receive the sampled electromagnetic signals.

2. The apparatus of claim 1, wherein the integrator device is to provide a filter function to transform the received sampled electromagnetic signals.

3. The apparatus of claim 1, wherein the electronics component further includes an equalizer device and a gain device.

4. The apparatus of claim 1, wherein the electronics component further includes an adaptive feedback loop to control an output of the integrator device.

5. The apparatus of claim 4, wherein the adaptive feedback loop is to latch the output of the integrator device.

6. The apparatus of claim 4, wherein the adaptive feedback loop includes a droop control device to substantially maintain a particular level of the output of the integrator device.

7. The apparatus of claim 1, wherein the electronics components is to perform signal processing to the received electromagnetic signals to allow data signals corresponding to the recovered sampled signals to be validated.

8. The apparatus of claim 1, wherein the received sampled electromagnetic signals are based on the data on the link.

9. The apparatus of claim 1, wherein the link comprises one of a bus, an interconnect, a trace, a cable and an electrical connection means.

10. The apparatus of claim 1, wherein the electromagnetic coupler probe comprises two signal traces.

11. An apparatus comprising:
    an integrator device to receive signals from an electromagnetic coupler probe and to provide a filter function to the received signal; and
    an adaptive feedback loop to control an output of the integrator device, the adaptive feedback loop including a droop control device to substantially maintain a particular level of the output of the integrator device.

12. The apparatus of claim 11, further comprising:
    an equalizer device and a gain device.

13. The apparatus of claim 11, wherein the adaptive feedback loop is to latch the output of the integrator device.

14. The apparatus of claim 11, wherein the received signals are based on data transmitted across a link.

15. A system comprising:
    an electromagnetic coupler probe to receive electromagnetic signals based on data on a link;
    an electronics component to receive the electromagnetic signals from the electromagnetic coupler probe, the electronics component including an integrator device to provide recovered electromagnetic signals; and
    an analyzing device to receive the recovered electromagnetic signals to allow data signals corresponding to the recovered electromagnetic signals to be validated.

16. The system of claim 15, wherein the integrator device is to provide a filter function to the received electromagnetic signals.

17. The system of claim 15, wherein the electronics component further includes an equalizer device and a gain device.

18. The system of claim 15, wherein the electronics component further includes an adaptive feedback loop to control an output of the integrator device.

19. The system of claim 18, wherein the adaptive feedback loop is to latch the output of the integrator device.

20. The system of claim 18, wherein the adaptive feedback loop includes a droop control device to substantially maintain a particular level of the output of the integrator device.

* * * * *